US007079606B2

(12) United States Patent
Voyer

(10) Patent No.: US 7,079,606 B2
(45) Date of Patent: Jul. 18, 2006

(54) METHOD OF OBTAINING AN ANTENNA GAIN

(75) Inventor: Nicolas Voyer, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 929 days.

(21) Appl. No.: 09/971,701

(22) Filed: Oct. 9, 2001

(65) Prior Publication Data

US 2002/0105465 A1 Aug. 8, 2002

(30) Foreign Application Priority Data

Oct. 31, 2000 (FR) .................................. 00 14222

(51) Int. Cl.
*H04L 27/08* (2006.01)

(52) U.S. Cl. ...................... 375/345; 375/347; 375/240; 342/378

(58) Field of Classification Search ................ 375/345, 375/347, 240; 342/378; 381/94.7
See application file for complete search history.

(56) References Cited

U.S. PATENT DOCUMENTS 4,286,268 A 8/1981 Daniel et al. ............... 343/100
4,442,433 A * 4/1984 Myers et al. ............... 342/378
4,956,867 A * 9/1990 Zurek et al. ............... 381/94.7
5,719,583 A * 2/1998 Kanai ......................... 342/378
5,937,018 A * 8/1999 Golden ....................... 375/347

FOREIGN PATENT DOCUMENTS

DE 2 743 939 7/1997
EP 0 867 970 9/1998

OTHER PUBLICATIONS

U.S. Appl. No. 09/971,701, filed Oct. 09, 2001, pending.
U.S. Appl. No. 09/981,980, filed Oct. 19, 2001, pending.
U.S. Appl. No. 09/982,800, filed Oct. 22, 2001, pending.

* cited by examiner

*Primary Examiner*—Shuwang Liu
*Assistant Examiner*—Eva Zheng
(74) *Attorney, Agent, or Firm*—Oblon, Spivak, McClelland, Maier & Neustadt, P.C.

(57) ABSTRACT

A method for obtaining a gain function by using an array of antennae and a weighting of the signals received or to be transmitted by vectors of complex coefficients. The complex coefficients are referred to as weighing vectors, according to which, a reference gain function being given, the reference gain function is projected orthogonally onto the sub-space of a gain function. The sub-space of the gain function is generated by the weighting vectors of the space of the gain functions. The weighting vectors of the space of the gain functions are provided in advance with a norm, and a weighing vector generating the reference gain function thus projected is chosen as the optimum weighting vector.

14 Claims, 2 Drawing Sheets

METHOD OF OBTAINING AN ANTENNA GAIN

BACKGROUND OF THE INVENTION (a) Field of the Invention

The present invention concerns in general terms a method of obtaining an antenna gain function. More particularly, the present invention relates to a method of obtaining an antenna gain for a base station in a mobile telecommunication system. It makes it possible to obtain an antenna gain function, in transmission or reception mode, which is invariant by change of frequency.

(b) Description of the Related Art

The formation of channels or the elimination of interfering signals is well known in the field of narrow-band antenna processing. Both of these use an array of antennae, generally linear and uniform (that is to say with a constant pitch) and a signal weighting module. More precisely, if it is wished to form a channel in reception mode, the signals received by the different antennae are weighted by means of a set of complex coefficients before being added. Conversely, if it is wished to form a channel in transmission mode, the signal to be transmitted is weighted by a set of complex coefficients and the signals thus weighted are transmitted by the different antennae.

FIG. 1 illustrates a known device for obtaining antenna gain in transmission and reception mode. The device comprises an array of antennae $(\mathbf{10}_0),(\mathbf{10}_1), \ldots ,(\mathbf{10}_{N-1})$, a transmission weighting module (11) and a reception weighting module (15). The signals received by the different antennae, $(x_i)$, i=0 . . . N−1 are weighted at $(\mathbf{13}_0),(\mathbf{13}_1) \ldots, (\mathbf{13}_{N-1})$ by a set of complex coefficients $(b_{ui})$, i=0, . . . ,N−1 before being added at (14) in order to give a signal $R_u$. Conversely, a signal to be transmitted $S_d$ is weighted at $(12_0),(12_1) \ldots ,(12_{N-1})$ by means of a set of complex coefficients $(b_{di})$, i=0, . . ,N−1, before being transmitted by the different antennae.

If respectively the vector of the signals received and the vector of the weighting coefficients is denoted $\overline{x}=(x_0,x_1, \ldots , x_{N-1})^T$ and $\overline{b^u}=(b_{u0},b_{u1}, \ldots ,b_{uN-1})^T$, it is possible to write:

$$R_u=\overline{b}_u\overline{x} \quad (1)$$

The complex gain (or the complex gain function of the antenna) in reception mode can be written:

$$G(\overline{b_u}, \theta) = \overline{b_u}^T \cdot \overline{e_u\theta} = \sum_{i=0}^{N-1} b_{ui} \cdot \exp(-j\varphi_i) \quad (2)$$

where $e_{u\theta}$ represents the vector $\overline{x}$ corresponding to a flat wave arriving at an angle of incidence θ, and $$\phi_i=(2\pi d/\lambda).i.\sin(\theta)=(2\pi df/c).i.\sin(\theta) \quad (3)$$

is the difference in operation between consecutive antennae for a uniform linear array of pitch d, λ and f being respectively the wavelength and the frequency of the flat wave in question;

$$\phi_i=2\pi R\Delta\theta/\lambda.\sin(\theta-\theta_i)=2\pi Rf\Delta\theta/c.\sin(\theta-\theta_i) \quad (4)$$

for a circular array where $\theta_i$ is the angle between a reference axis and the normal to the antenna of index i, R the radius of curvature of the array, Δθ is the angular difference between two consecutive antennae in the array.

Likewise the complex gain (or the complex gain function) in transmission mode can be written:

$$G(\overline{b_d}, \theta) = \overline{b_d}^T \cdot \overline{e_d\theta} = \sum_{i=0}^{N-1} b_{di} \cdot \exp(j\varphi_i) \quad (5)$$

with the same conventions as those adopted above and where $\overline{ed\theta}$ designates the vector $\overline{x}$ corresponding to a flat wave transmitted in the direction θ. The weighting vectors in reception and transmission mode respectively will be called $\overline{b_u}$ and $\overline{b_d}$.

Clearly, the antenna gain in transmission or reception mode depends on the frequency of the signal in question. There are however many situations in which the antenna gain must remain unchanged whatever the frequency of the signal. For example, in so-called FDD (Frequency Division Duplex) mobile telecommunication systems, where the frequency used on the downlink, that is to say from the base station to the mobile station, differs from that used on the uplink. Similarly, in frequency-hopping radar systems, it is necessary to ensure the invariance of the gain function, notably in order to aim a transmission or reception beam in a given direction or to eliminate the interference coming from a given direction, whatever the frequency used.

In more general terms, it is desirable to be able to obtain, for a given signal frequency, an antenna gain function which is as close as possible, in the sense of a certain metric, to a reference gain function. The reference gain function can notably be a gain function obtained at a given frequency which it is sought to approximate to the greatest possible extent during transmission or reception at another frequency.

SUMMARY OF THE INVENTION

The aim of the invention is to propose a method of obtaining a gain function making it possible, for a given signal frequency, to approach a reference gain function as closely as possible.

A subsidiary aim of the invention is to propose a method for best approaching an antenna gain function obtained at a given frequency when the network is transmitting or receiving at another frequency.

To this end, the invention is defined by a method of obtaining a gain function by means of an array of antennae and a weighting of the signals received or to be transmitted by vectors $(\overline{b})$ of N complex coefficients, referred to as weighting vectors, N being the number of antennae in the array, according to which, a reference gain function being given, the said reference gain function is projected orthogonally onto the sub-space of the gain functions generated by the said weighting vectors of the space of the gain functions, provided in advance with a norm, and a weighting vector generating the reference gain function thus projected is chosen as the optimum weighting vector.

The gain functions are preferably represented by vectors $(\overline{G})$, referred to as gain vectors, of M complex samples taken at M distinct angles, defining sampling directions and belonging to the angular range covered by the array, the space of the gain functions then being the vector space $C^M$ provided with the Euclidian norm and that, for a given frequency (f), the reference gain vector is projected on the vector sub-space (Imf) of the gain vectors generated by the array operating at the said frequency in order to obtain the said optimum weighting vector.

Advantageously, M is chosen such that $M>\pi N$.

According to one example embodiment, the sampling angles are distributed uniformly in an angular range covered by the array.

The reference gain vector can be obtained by sampling the reference gain function after anti-aliasing filtering.

The gain vectors $(\overline{G})$ being the transforms by a linear application $(h_s^f)$ of $C^N$ in $C^M$ weighting vectors of the array and $H_f$ being the matrix, of size M×N, of the said linear application of a starting base of $C^N$ in an arrival base $C^M$, the said optimum weighting vector, for a given frequency f, is preferably obtained from the reference gain vector $\overline{G}$ as $\overline{b}=H_f^+.\overline{G}$ where $H_f^+=(H^{*T}_f.H_f)^{-1}.H^{*T}_f$ is the pseudo-inverse matrix of the matrix $H_f$ and where $H^{*T}_f$ the conjugate transpose of the matrix $H_f$.

The said starting base being that of the vectors $\overline{e}_k$, k=0, . . . , N−1, such that $\overline{e}_k=(e_{k,0},e_{k,1}, \ldots ,e_{k,N-1})^T$ with $$e_{k,i} = \exp\left(j\cdot\frac{2\pi fd}{c}\cdot i\cdot\sin\theta_k\right)$$

and $\theta_k=k\pi/N$ $k=-(N-1)/2, \ldots ,0, \ldots ,(N-1)/2$ and the arrival base being the canonical base, the matrix $H_f$ then has the components:

$$H_{pq} = \exp(j(N-1)\Psi_{pq}/2)\cdot\frac{\sin(N\Psi_{pq}/2)}{\sin(\Psi_{pq}/2)}$$

with $\Psi_{pq}=\pi\eta(\sin(\rho\pi/N)-\sin(q\pi/M))$ and $\eta=f/f_0$ with $f_0=c/2d$, d being the pitch of the array.

If the reference gain vector is obtained by sampling the gain function generated at a first operating frequency $f_1$ of the array by a first weighting vector $\overline{b_1}$, the optimum weighting gain vector for a second frequency $f_2$ is obtained by $\overline{b_2}=H^+_{f2}.H_{f1}\overline{b_1}$.

The frequency $f_1$ of operation of the array is for example the frequency of an uplink between a mobile terminal and a base station in a mobile telecommunication system and the frequency $f_2$ of operation of the array is for example the frequency of a downlink between the said base station and the said mobile terminal.

BRIEF DESCRIPTION OF THE DRAWINGS

The characteristics of the invention mentioned above, as well as others, will emerge more clearly from a reading of the following description given in relation to the accompanying figures, amongst which.

DETAILED DESCRIPTION OF THE INVENTION

Figure 1:
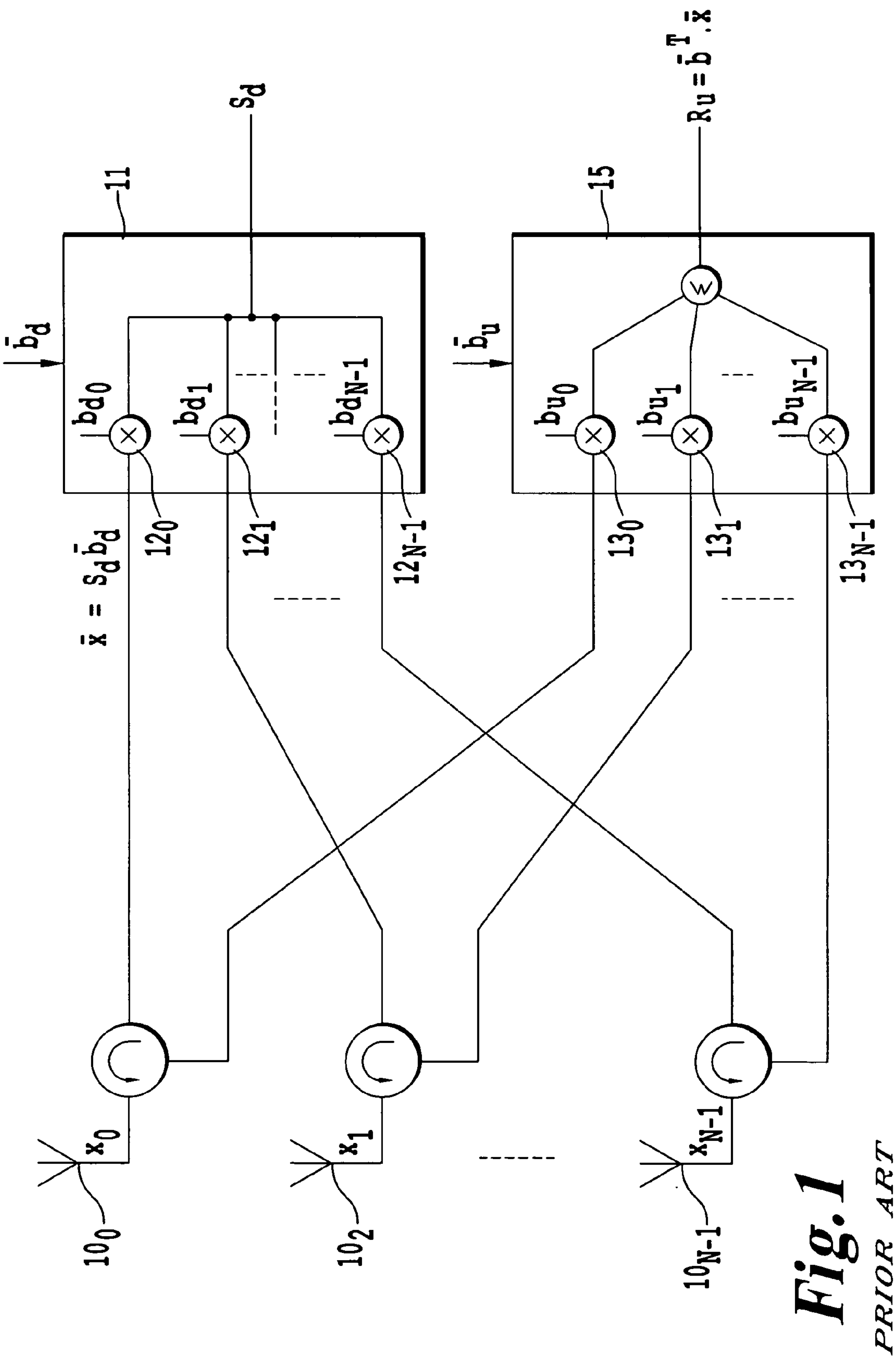
Fig. 1 PRIOR ART
FIG. 1 depicts schematically a known device for obtaining an antenna gain function.

A first general idea at the basis of the invention is to best approximate a reference gain function by virtue of a linear combination of base functions.

A second general idea at the basis of the invention is to sample the reference gain function and to best approximate the series of samples obtained by means of a linear combination of base vectors.

The first embodiment of the invention consists of approximating the reference gain function by means of a linear combination of base functions.

Let h be the linear application of $C^N$ in the vector space F of the complex functions defined on $[-\pi/2,\pi/2]$ (or $[-\pi,\pi]$) which associates with any vector $\overline{b}$ of complex numbers the function $h(\overline{b})$ such that $h(\overline{b})(\theta)=G(\overline{b},\theta)$ where G is a complex gain function in transmission or reception mode as defined at (2) or (5). $C^N$ being a vector space of dimension N on C, the image of $C^N$ by h is a vector sub-space of F of dimension at most equal to N, which will be denoted $Im_f$ to emphasise that the image depends on the frequency f in question in expression (2) or (5).

Let G be a reference complex gain function, the problem is to find the weighting vector $\overline{b}$ such that $h(\overline{b})$ is as close as possible to G in the sense of a certain metric. For a uniform linear array, the metric corresponding to the scalar product on F $$w_1\cdot w_2 = \int_{-\pi/2}^{\pi/2} w_1(\theta)\cdot w_2'(\theta)\cos(\theta)d\theta$$

and therefore to the norm $$\|w\|^2 = \int_{-\pi/2}^{\pi/2} |w(\theta)|^2\cos\theta\cdot d\theta$$

is chosen. The case of the circular array can b a similar manner (the chosen norm does not then include the term $\cos(\theta)$). The space $F_2$ of the functions of F of bounded norm is itself a vector space normed by the above norm. If G is an element of $F_2$, the element of the sub-space $Im_f$ closest to G is then the projection of G onto this sub-space.

If the vector sub-space corresponding to the inherent frequency of the array is considered to be $Im_{f0}$, it is possible to demonstrate that the functions $e_k(\theta)$, k=0, . . . ,N−1 defined by:

$e_k(\theta)=h(\overline{b_k})(\theta)=G(\overline{b_k},\theta)$, where $\overline{b_k}$ is the vector of components $b_{ki}=\exp(j.2\pi ki/N)$, are orthogonal. Being N in number, they therefore form a base of $Im_{f0}$. In more general terms, it can be shown that, if two vectors $\overline{b}$ and $\overline{b'}$ are orthogonal, that is to say are such that $\overline{b}\overline{b'}=\overline{b}^T\overline{b'}=0$, the functions $h(\overline{b})$ and $h(\overline{b'})$ of $Im_{f0}$ are orthogonal.

This is because:

$$h(\overline{b})\cdot h(\overline{b'}) = \sum_{i=0}^{N-1}\sum_{i'=0}^{N-1} b_i\cdot b_{i'}'\int_{-\pi/2}^{\pi/2}\exp(j(i-i')\varphi(\theta))\cos(\theta)d\theta = \sum_{i=0}^{N-1}\sum_{i'=0}^{N-1} b_i\cdot b_{i'}'\cdot\mathrm{sinc}(\pi\eta(i-i')) \quad (6)$$

with $\phi(\theta)=2\pi fd/c.\sin\theta=\pi\eta\sin\theta$ where $\eta=f/f_0\leqq 1$, is the ratio of the frequency used at the maximum frequency $f_0=c/2d$, which can resolve the array without ambiguity, which will be referred to as the natural frequency of the array, and where sinc. is the cardinal sine function. For $\eta=1$, the terms below the sum signs of the second member of equation (6) are zero if $i\neq i'$ and therefore the second member is equal to zero if the vectors $\overline{b}$ and $\overline{b'}$ are orthogonal.

Consider now the general case of a frequency $f \leqq f_0$. Let $e_k(\theta)$, k=0, . . . ,N−1 be an orthogonal base of $Im_f$. By definition, $e_k(\theta)=h(\overline{b_k})(\theta)=G(\overline{b_k},\theta)$ where $\overline{b_k}$ is a vector of $C^N$. Consider now a gain function G of $F_2$. It can be projected onto the vectors $e_k(\theta)$. If $\lambda_k=G.e_k$ is written, then the vector of $C^N$, $$\overline{b_G} = \sum_{k=0}^{P-1} \lambda_k \overline{b_k}$$

is such that $h(\overline{b_G})$ best approximates the function G.

The second embodiment of the invention consists of approximating a vector of samples of the reference gain function by means of a linear combination of base vectors.

Let $G_0(\theta)$ be the antenna gain function obtained without weighting for a linear uniform array, it is easily shown that:

$$|G_0(\theta)| = \frac{\sin(N\varphi/2)}{\sin(\varphi/2)} \text{ with } \varphi = 2\pi fd/c \cdot \sin\theta \quad (7)$$

This function has zeros for the values $\phi_k=2k\pi/N$, k integer non-zero such that $\phi_k \in [-\pi,\pi[$ that is to say in the directions for which $\sin \theta_k=k.c/Nfd$, when this expression has a direction. The phase difference between two consecutive zeros of the gain diagram is constant and is equal to $\Delta\phi=2\pi/N$. The angular difference between two consecutive zeros of the diagram varies in terms of Arcsin., a function whose derivative is increasing on [−1,1] and is therefore at a minimum for the angular difference between the first and second zeros. It is therefore bounded by $\Delta\theta_{min}=c/Nfd$ if N is sufficiently great. It will be assumed that the frequencies used are less than $f_0$ where $f_0$ is the natural frequency of the array. It can be concluded from this that the spectrum of the function $G_0(\theta)$ has a support bounded by $1/\Delta\ \theta_{min}=N/2$.

In more general terms, let $G(\theta)$ be the antenna gain function obtained by means of a weighting vector $\overline{b}$. G can be expressed as the Fourier transform (FT) (in reception mode) or the inverse Fourier transform (in transmission mode) of the complex weighting distribution of the antenna, namely:

$$b(x) = \sum_{i=0}^{N-1} b_i \cdot \delta(x - x_i)$$

with $x_i$=i.d; this gives: $G_{b1}(\theta)=B(\sin\theta)$ with $$B(u) = \int_{-\infty}^{+\infty} b(x)\exp(-j2\pi ux/\lambda)\,dx$$

and likewise $G_d(\theta)=B'(\sin\theta)$ with $$B'(u) = \int_{-\infty}^{+\infty} b(x)\exp(j2\pi ux/\lambda)\,dx.$$

The function b(x) being delimited by N.d, the difference between two zeros of the function B or B' is at least λ/N.d and therefore even more so 2/N. Given the increase in the derivative of the function Arcsin. the minimum difference between two zeros of the function G is 2/N. The function G therefore has a spectrum delimited by N/2.

According to the Shannon sampling theorem, it is concluded that it is possible to reconstitute the function $G(\theta)$ if sampling is carried out at a frequency greater than the Nyquist frequency, i.e. N. In other words, for an angular range [−π/2,π/2], at a minimum M>π.N samples are necessary, where M is integer. In practice K.N samples can be taken with K integer, K≧4.

For a circular array, it can be shown that $1/\Delta\theta_{min}$=N and the angular range being [−π,π], M (M>π.N and M integer) angularly equidistributed samples also suffice to reconstitute the function $G(\theta)$.

In the general case of the sampling of any gain function $G(\theta)$, it is necessary to previously filter $G(\theta)$ by means of an anti-aliasing filter before sampling it. It then suffices to take M samples of the filtered diagram over the whole of the angular range in order to reconstitute the filtered diagram.

Let $(g_k)$, k=0, . . . ,M−1 be the samples of the complex diagram, possibly filtered by an anti-aliasing filtering if necessary, that is to say $g_k=G'(\theta_k)$ where the $\theta_k$ are M angles equidistributed over [−π/2,π/2] or [−π,π] and where it is assumed that G' was the filtered version of the reference complex diagram.

It is now possible to define a linear application, $h^f_s$ of $C^N$ in $C^M$ which makes the vector $h_s^f(\overline{b})=\overline{G}=(g_0,g_1, \ldots ,g_{M-1})^T$, where $g_k=G(\overline{b},\theta_k)$, correspond to any vector $\overline{b}$. The image of $C^N$ by $h^f_s$, is a vector sub-space of $C^M$ of dimension at most equal to N, which will be noted $Im_f$. If a base of $C^N$ is chosen, for example the canonical base, and a base of $C^M$, the linear application $h^f_s$ can be expressed by a matrix $H_f$ of size M×N which is at most of rank N.

Let $\overline{G}$ be any gain vector corresponding to a sampled gain function. The problem is to find a vector $\overline{b}$ such that $h_s^f(\overline{b})$ is the closest to $\overline{G}$ in the sense of a certain metric. The Euclidian norm on $C^M$, namely $$\|\overline{G}\|^2 = \sum_{k=0}^{M-1} |g_k|^2,$$

will be taken as the norm. If it exists, the sought-for vector $\overline{b}$ is then such that $h_s^f(b)=\overline{G}_p$ where $\overline{G}_p$ the orthogonal projection of the vector $\overline{G}$ onto $Im_f$. If the matrix $H_f$ is of rank N, the sought-for vector $\overline{b}$ exists and can be written:

$$\overline{b}=H_f^+.\overline{g} \quad (8)$$

where $H_f^+=(H^{*T}_f.H_f)^{-1}.H^{*T}_f$ is the pseudo-inverse matrix of the matrix $H_f$ with transposed $H^{*T}_f$ the conjugate of the matrix $H_f$.

In the discrete case as in the continuous case, the reference gain function (sampled in the discrete case) is projected onto the sub-space generated by the functions (continuous case) or the vectors (discrete case) associated with the array weighting vectors.

In order to express the matrix $H_f$, it is necessary to agree a base of the starting space and a base of the arrival space. It is possible to choose as a base of $C^M$ the canonical base and as a base of $C^N$ a base adapted to the description of the flat waves of frequency f. Consider the distinct vectors $\overline{e}_k$, k=0, . . ,N−1, such that $\overline{e}_k=(e_{k,0}e_{k,1}, \ldots ,e_{k,N-1})^T$ with $$e_{k,i} = \exp\left(j \cdot \frac{2\pi fd}{c} \cdot i \cdot \sin\theta_k\right) = \exp(j\pi \cdot \eta \cdot i \cdot \sin\theta_k)$$

with $\eta = f/f_0$ and where the $\theta_k$ belong to the interval $[-\pi/2, \pi/2]$. The vectors $e_k$ are the weighting vectors of the array making it possible to form beams in the directions $\theta_k$. The vectors $\bar{e}_k$ form a base if the determinant of the coordinates of the $\bar{e}_k$ in the canonical base of $C^N$ is non-zero. This determinant is a Vandermonde determinant which is equal to $$\prod_{p \neq q} (\exp(j\varphi_p) - \exp(j\varphi_q)) \text{ with } \varphi_k = \pi\eta\sin\theta_k.$$

This determinant is cancelled out if and only if there are two angles $\theta_p$ and $\theta_q$ such that $\sin\theta_p - \sin\theta_q = 2/\eta$. In other words, for $\eta < 1$ the N vectors $\bar{e}_k$ always form a base, and for $\eta = 1$ only the case $\theta_p = -\theta_q = \pi/2$ is excluded. The directions can, for example, be chosen so as to be equidistributed, that is to say such that $\theta_k = k\pi/N$ with $k = -(N-1)/2, \ldots, 0, \ldots, (N-1)/2$. In this case, the matrix $H_f$ has as its components:

$$H_{pq} = \sum_{i=0}^{N-1} \exp(j\pi\eta \cdot i \cdot \sin(p\pi/N))\exp(-j\pi\eta \cdot i \cdot \sin(q\pi/M)) \tag{9}$$

or:

$$H_{pq} = \sum_{i=0}^{N-1} \exp(j\pi\eta \cdot i \cdot [\sin(p\pi/N) - \sin(q\pi/M)])$$

$$= \exp(j(N-1)\Psi_{pq}/2) \cdot \frac{\sin(N\Psi_{pq}/2)}{\sin(\Psi_{pq}/2)}$$

with $\Psi_{pq} = \pi\eta(\sin(p\pi/N) - \sin(q\pi/M))$

Alternatively, it is possible to choose as a starting base another base adapted to the frequency f, the one formed by the vectors $\bar{e}'_k$, such that $e'_{k,i} = \exp(j\ \pi.\eta.i.\sin\ \theta_k)$ with $\sin\theta_k = 2k/\eta N$ and $k = -(N-1)/2, \ldots, 0, \ldots, (N-1)/2$. These vectors exist if $|\sin\theta_k| \leqq 1, \forall k$, that is to say for $\eta > 1-1/N$ and in this case the vectors $\bar{e}'_k$ form a base which has the advantage of being orthogonal.

Alternatively, it is possible to choose as a starting base the canonical base of $C^N$, which has the advantage of not depending on the frequency. In this case, the matrix $H'_f$ expressed in this base is written:

$$H'_f = H_f . T^{-1} \tag{10}$$

where T is the matrix of the coordinates of $\bar{e}_k$ in the canonical base, that is to say $T_{pp'} = \exp(j\pi p \sin(p'/N))$. It was seen above that this matrix had a non-zero Vandermonde determinant and was consequently reversible.

Whatever the chosen base, consider now a gain function obtained at a first frequency $f_1, f_1 \leqq f_0$ and $\overline{G_1} = h_s^{f1}(\overline{b_1})$ the vector of the samples associated with this gain function. Let there be a second working frequency $f_2$, $f_2 \leqq f_0$. $\overline{G_1}$ belonging to $C^M$, if the matrix $H_{f2}$ is of rank N, it is possible to find a vector $\overline{b_2}$ such that $h_s^{f2}(\overline{b_2})$ is the projection of $h_s^{f1}(\overline{b_1})$ onto $\mathrm{Im}f_2$. The vector $\overline{b_2}$ is obtained by means of the matrix equation:

$$\overline{b_2} = H_{f2}^{+}.H_{f1}\,\overline{b_1} \tag{11}$$

This equation makes it possible in particular to obtain, at a second working frequency, a sampled gain diagram which is as close to possible to the one, referred to as the reference one, obtained at a first working frequency.

Equation (11) advantageously applies to the array of a base station in a mobile telecommunication system operating in FDD. Equation (10) makes it possible to directly obtain the weighting vector to be applied for the "downlink" transmission at a frequency $f_d$ on the weighting vector relating to the "uplink" transmission at a frequency $f_u$. For the paired frequencies $f_d$ and $f_u$, it is then possible to write:

$$\overline{b_d} = H_d^{+}.H_u\overline{b_u} \tag{12}$$

The base station can thus direct transmission beams to the mobile terminals using a gain function optimised for the reception of the signals transmitted by these terminals.

Figure 2:
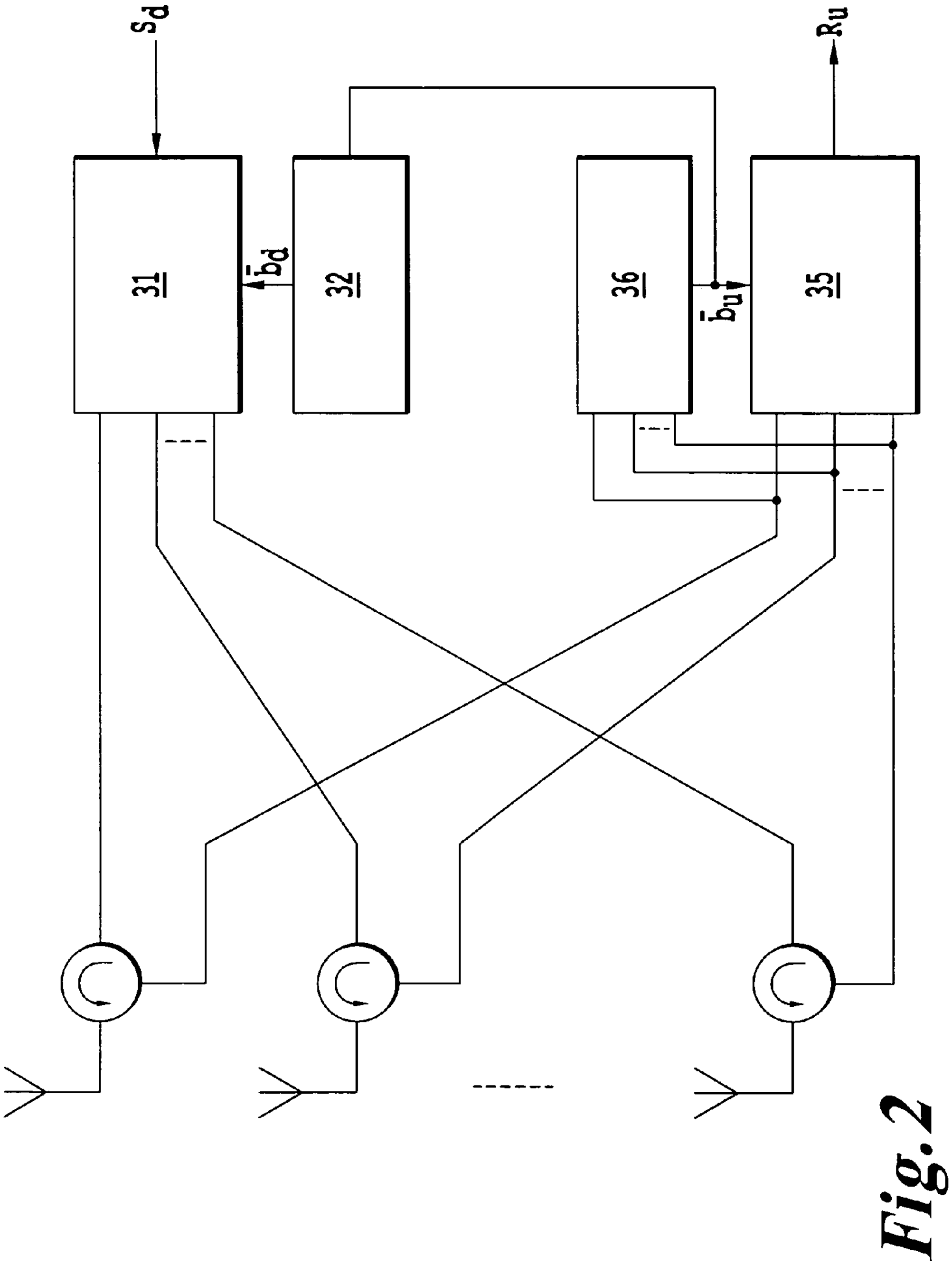
FIG. 2 depicts schematically a device for obtaining an antenna gain function according to one example embodiment of the invention.

FIG. 2 depicts an example of an embodiment implementing the second embodiment. The device comprises a transmission weighting module (31) and a reception weighting module (35) with a structure identical to that of the modules (11) and (15) respectively. The module (35) is associated with a module (36) supplying the complex coefficients for the formation of reception channels and/or the elimination of signals in the interference directions. The module (36) determines, in a manner known per se, a weighting vector $\overline{b_u}$ which maximises the signal received in the useful direction or directions and minimises it in the interference directions. Advantageously $b_u$ is calculated adaptively from the signals received by the different antennae. The vector is on the one hand used by the reception weighting module (35) and on the other hand transmitted to a projection and inversion module (32) determining the vector $\overline{b_d}$ from equation (12). The vector $\overline{b_d}$ is used for weighting the signals to be transmitted in the module (31). As seen above, the transmission gain diagram at frequency $f_u$ will minimise the difference, in the sense of the Euclidian distance, between the transmission gain vector $\overline{G_d}$ and the reception gain vector $\overline{G_u}$.

Although the invention has been essentially described, for reasons of simplicity of presentation, in the context of a uniform linear array, it can apply to any type of antenna array and notably to a circular array.

What is claimed as new and desired to be secured by Letters Patent of the United States is:

1. A method of obtaining a gain function from an array of antennae and a weighting of signals received or to be transmitted by vectors $(\bar{b})$ of N complex coefficients, referred to as weighting vectors, N being the number of antennae in the array, comprising the steps of:

generating a sub-space which is normed and orthogonal with respect to a space of gain functions, the gain functions being generated by the weighting vectors;

projecting a desired reference function onto the sub-space; and choosing a weighting vector which generates a gain function approximate to the projection of the desired reference gain function in the sub-space, as an optimum weighting vector.

2. The method of obtaining the gain function according to claim 1, wherein the gain functions are represented by vectors $(\bar{G})$ referred to as gain vectors, of M complex samples taken at M distinct angles, defining sampling directions and belonging to the angular range covered by the array, further comprising:

providing the space of the gain functions being the vector space $C^M$ with an Euclidian norm; and projecting the reference gain function for a given frequency (f) onto the vector sub-space ($Im_f$) of the gain vectors generated by the array operating at the frequency in order to obtain the optimum weighting vector.

3. The method of obtaining the gain function according to claim 2, wherein M is chosen such that $M>\pi N$.

4. The method of obtaining the gain function according to claim 2 or 3, wherein the M distinct angles are uniformly distributed in the angular range covered by the array.

5. The method of obtaining the gain function according to claim 2, wherein the reference gain function is obtained by sampling the reference gain function after an anti-aliasing filtering.

6. The method of obtaining the gain function according to claim 2, further comprising:

transforming the gain vectors ($\overline{G}$) by a linear application ($h_s^f$) of $C^N$ in $C^M$ of the weighting vectors of the array and Hf being the matrix of size M×N of the said linear application of a starting base of $C^N$ in an arrival base $C^M$, the optimum weighting vector for a given frequency is obtained from the reference gain vector $\overline{G}$ as $\overline{b}=H_f^+\cdot\overline{G}$ wherein $H_f^+=(H_{f*}^T\cdot H_f)^{-1}\cdot H_{f*}^T$ is the pseudo-inverse matrix of the matrix $H_f$ and where $H_{f*}^T$ is the conjugate transpose of the matrix $H_f$.

7. The method of obtaining the gain function according to claim 6, wherein said starting base being that of the vectors $\overline{e}_k$, k=0, . . . ,N−1, such that $\overline{e}_k=(e_k, 0, e_k, 1, \ldots, e_k, N-1)^T$ with $$e_{k,i} = \exp\left(j\cdot\frac{2\pi fd}{c}\cdot i\cdot\sin\theta_k\right)$$

and $\theta_k=k\pi/N$, k=−(N−1)/2, . . . ,0, . . . ,(N−1)/2 and the arrival base being a canonical base, the matrix $H_f$ having the components:

$$H_{pq} = \exp(j(N-1)\Psi_{pq}/2)\cdot\frac{\sin(N\Psi_{pq}/2)}{\sin(\Psi_{pq}/2)}$$

with $\Psi_{pq}=\pi\eta(\sin(p\pi/N)-\sin(p\pi/M)$ and $\eta=f/f_o$ with $f_o=c/2d$, d being the pitch of the array.

8. The method of obtaining the gain function according to claim 6, wherein the reference gain vector is obtained by sampling the gain function generated at a first operating frequency $f_1$ of the array by using a first weighting vector $\overline{b}_1$ and wherein the optimum weighting gain vector for a second frequency $f_2$ is obtained by $\overline{b}_2=H_{f2}^+\cdot H_{f1}\cdot\overline{b}_1$.

9. The method of obtaining the gain function according to claim 8, wherein the operating frequency $f_1$ of the array is the frequency of an uplink between a mobile terminal and a base station in a mobile telecommunication system and in that the operating frequency $f_2$ of the array is the frequency of a downlink between the base station and the mobile terminal.

10. The method of obtaining the gain function according to claim 7, wherein the reference gain vector is obtained by sampling the gain function generated at a first operating frequency $f_1$ of the array using a first weighting vector $\overline{b}_1$ and wherein the optimum weighting gain vector for a second frequency $f_2$ is obtained by $\overline{b}_2=H_{f2}^{+l\cdot H}{}_{f1}\cdot\overline{b}_1$.

11. The method of obtaining the gain function according to claim 3, further comprising:

transforming the gain vectors ($\overline{G}$) by a linear application ($h_s^f$) of $C^N$ in $C^M$ of the weighting vectors of the array and $H_f$ being a matrix of size M×N of the linear application of a starting base of $C^N$ in an arrival base $C^M$, the optimum weighting vector for a given frequency f is obtained from the reference gain vector $\overline{G}$ as $\overline{b}=H_f^+\cdot\overline{G}$ wherein $H_f^+=(H_{f*}^T\cdot H_f)^{-1}\cdot H_{f*}^T$ is the pseudo-inverse matrix of the matrix $H_f$ and where $H_{f*}^T$ is the conjugate transpose of the matrix $H_f$.

12. The method of obtaining the gain function according to claim 1, wherein the norm provided to the vector space is an Euclidian norm.

13. The method of obtaining the gain function according to claim 2, further comprising:

approximating a vector of samples of the reference gain function by using a linear combination of base vectors.

14. The method of obtaining the gain function according to claim 1, wherein the array of antennae is a circular array.

* * * * *